United States Patent
Narayanan (10) Patent No.: US 7,167,922 B2
(45) Date of Patent: Jan. 23, 2007

(54) METHOD AND APPARATUS FOR PROVIDING AUTOMATIC INGRESS FILTERING

(75) Inventor: Ram Gopal Lakshmi Narayanan, Woburn, MA (US)

(73) Assignee: Nokia Corporation, Espoo (FI)

( * ) Notice: Subject to any disclaimer, the term of this patent is extended or adjusted under 35 U.S.C. 154(b) by 220 days.

(21) Appl. No.: 10/273,946

(22) Filed: Oct. 18, 2002

(65) Prior Publication Data
US 2004/0078485 A1    Apr. 22, 2004

(51) Int. Cl.
*G06F 15/173* (2006.01)
(52) U.S. Cl. .................. 709/242; 709/238; 370/244; 370/331; 370/351
(58) Field of Classification Search ............... 709/242, 709/238, 236; 370/331, 427, 252, 254, 389, 370/244, 351, 359; 710/316; 713/201; 714/42
See application file for complete search history.

(56) References Cited

U.S. PATENT DOCUMENTS

| | | | |
|---|---|---|---|
| 5,845,087 A * | 12/1998 | Trehus | 709/242 |
| 5,951,649 A * | 9/1999 | Dobbins et al. | 709/238 |
| 6,697,872 B1 * | 2/2004 | Moberg et al. | 709/238 |
| 6,708,218 B1 * | 3/2004 | Ellington et al. | 709/236 |
| 2002/0021675 A1 * | 2/2002 | Feldmann | 370/254 |
| 2003/0014665 A1 * | 1/2003 | Anderson et al. | 713/201 |
| 2003/0110289 A1 * | 6/2003 | Kamboh et al. | 709/242 |
| 2003/0110464 A1 * | 6/2003 | Davidson et al. | 716/17 |
| 2003/0224788 A1 * | 12/2003 | Leung et al. | 455/435.1 |
| 2004/0006640 A1 * | 1/2004 | Inderieden et al. | 709/242 |
| 2004/0006725 A1 * | 1/2004 | Lakshmanamurthy et al. | 714/42 |

* cited by examiner

Primary Examiner—Saleh Najjar
Assistant Examiner—ThuHa Nguyen
(74) Attorney, Agent, or Firm—Harrington & Smith, LLP (57) ABSTRACT

Disclosed is a method for routing data packets, as is a data packet router (10) that operates in accordance with the invention. The method includes establishing an ingress filter (20) in individual ones of a plurality of line cards (14) installed within a router and automatically maintaining a content of an ingress filter table (20A) of each ingress filter in each line card at least partially in accordance with data packets passing through individual ones of the line cards, where the content includes an identification of source addresses of hosts (16) coupled to the router. The method further compares a source address of an incoming packet to a line card to the content of the ingress filter table of that line card, and is thus enabled to detect the presence of an IP packet containing a spoofed IP host address. For a first occurrence of a packet having an IP source address that is not found in the ingress filter table, the packet is forwarded to a route processor (12) for analysis. The method further includes changing the content of the ingress filter table based on a result of the analysis to add the source address to the content of the ingress filter table, if the route processor has knowledge that the IP source address is associated with a valid host. At least some of the packets are Internet Protocol control packets, such as Routing Protocol Update packets, Dynamic Host Configuration Protocol packets, BootTP packets and Address Resolution Protocol packets. At least some of the hosts may be mobile hosts capable of connection and disconnection at different points in a subnet (22).

20 Claims, 6 Drawing Sheets

METHOD AND APPARATUS FOR PROVIDING AUTOMATIC INGRESS FILTERING

TECHNICAL FIELD

The teachings of this invention relate generally to data communications networks and procedures and, more specifically, relate to the filtering of incoming packets to a router or other data packet distribution apparatus. This invention relates even more specifically to ingress filters implemented by routers.

BACKGROUND

It is well known that in data communications networks, such as the Internet, security vulnerabilities are routinely exploited by hackers and other malicious users. Examples include denial of service attacks, worms and virus attacks, all of which exploit weaknesses in the Internet infrastructure. Typically the attacker desires to hide his or her identity, which can be determined from the source address field of the data packet. In order to accomplish this the attacker may use as the attacker's source address the Internet Protocol (IP) address of another node or host. This other host may be an existing (valid) host or a non-existing (or non-active or currently invalid) host. This common type of deception is typically referred to as "IP Spoofing". When a victim host receives such a request it has no knowledge of the legitimacy of the request, and it may react to the packet from the attacker and, in some cases, may respond to the packet. The IP Spoofing attack is a common problem, and attacks such as the Distributed Denial of Service (DDoS) are typically based on IP Spoofing.

There are several forms of defense to attacks that use a spoofed IP address. One basic mechanism involves filtering the packet before forwarding the packet towards its destination. This approach requires the configuration and management of data packet filters. How and when to filter an IP packet presents, however, a complex management task for a large Internet Service Provider (ISP) that typically receives millions of packets during short intervals of time. Many smaller ISPs may use some form static filters to protect their network resources from intrusion attacks. These ISPs may also prevent the attacker from learning the network topology by providing private addresses. In general, most such intrusive attacks occur at access networks and at network nodes where the packet traffic originates or terminates.

A network router forwards a received packet based on the destination address contained within the packet header. However, during the forwarding process the source address, also contained within the packet header, is normally not verified. An attacker may thus cleverly craft an IP packet with a source address that is an unused IP address, or with a valid IP address of another host (which can be located near to or far from the attacker or malicious host). The typical router does not have the intelligence to check the validity of the source address, as the router's primary purpose is to simply execute a packet forwarding function based on the packet destination address.

Tracking down the source of a packet (providing a trace ability) is a significant problem in the Internet. There are techniques such as those known as iTrace and as PathTrace that in general attempt to analyze the packet when the router or the network detects some abnormal behavior. Currently, however, it is difficult to detect and distinguish normal from abnormal behavior, a problem that is compounded by the fact that traffic patterns on the Internet are typically bursty. When a host is under attack the victim host and the network quickly become flooded with packets, at which time it is typically too late to react to the attack.

Ingress filtering is a mechanism whereby the network rejects a packet with an invalid (or spoofed) source address. This requires some explicit filtering scheme, typically near a gateway (a connection point to another network or to the Internet backbone) of the network, and requires some mechanism to configure and maintain the required ingress filter tables. However, the typical ISP does not desire to perform ingress filtering unless the ISP becomes the victim network, as it increases cost due to the required management and maintenance of the ingress filter(s). Furthermore, the majority of attacks occur near the access network where it is relatively easy for the attacker to flood the victim network with a packet storm. Thus, unless all ISPs incorporate an ingress filtering mechanism the forgery of an IP address at some unprotected ISP cannot be prevented.

It is believed that at present some ISPs perform a manual configuration and management of ingress filtering. However, this requires additional knowledge in order to constantly modify the ingress filter tables according to changes in the network topology.

As was noted above, routing is the activity of forwarding an IP packet towards the destination of the IP packet, as determined from the IP packet destination address field. The Routing Information Protocol (RIP), the Intermediate System to Intermediate System protocol (IS—IS) and Open Shortest Path First (OSPF) are examples of interior routing protocols used mainly within one administrative domain or Autonomous System (AS). Interior routing protocols such as OSPF perform routing based on link state, where network routers construct the routing topology (in the router database). The ensuing discussion will focus, for convenience, on the OSPF protocol. Those skilled in the art should realize, however, that other types of routing protocols could be similarly discussed.

Figure 1:
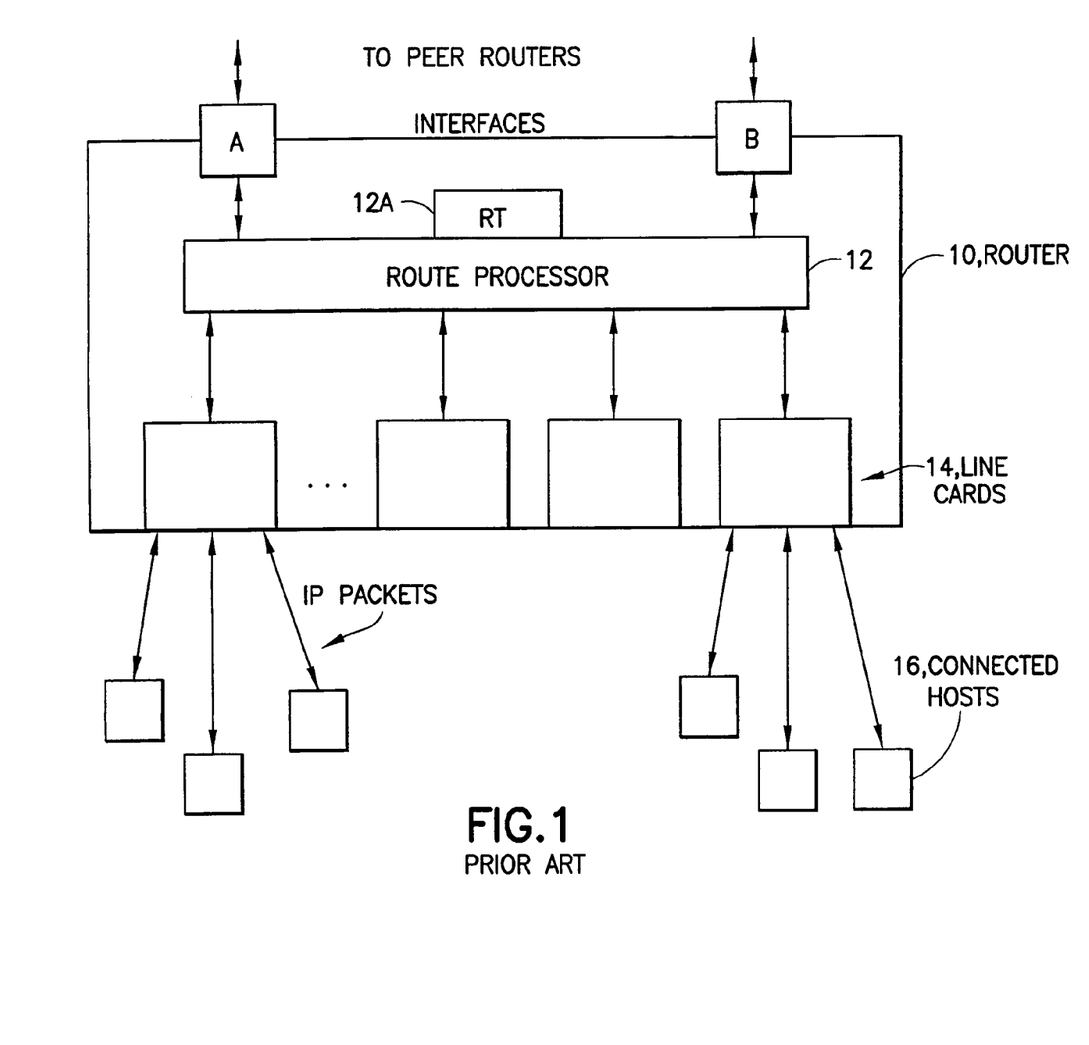
FIGS. 1, 2 and 3 are block diagrams of conventional IP networks containing routers connected to hosts.

Referring to FIG. 1, consider a router 10 with two external interfaces, A and B, and assume that the routing software is a monolithic unit embodied in a route processor 12. Assume also that router line cards 14, connected to hosts 16, are not provided with local intelligence. In this most basic case the route processor 12 stores and maintains a routing table (RT) 12A, and the lookup of destination addresses is performed using the routing table 12A. All incoming IP packets are simply forwarded from the line cards 14 to the route processor 12.

Figure 2:
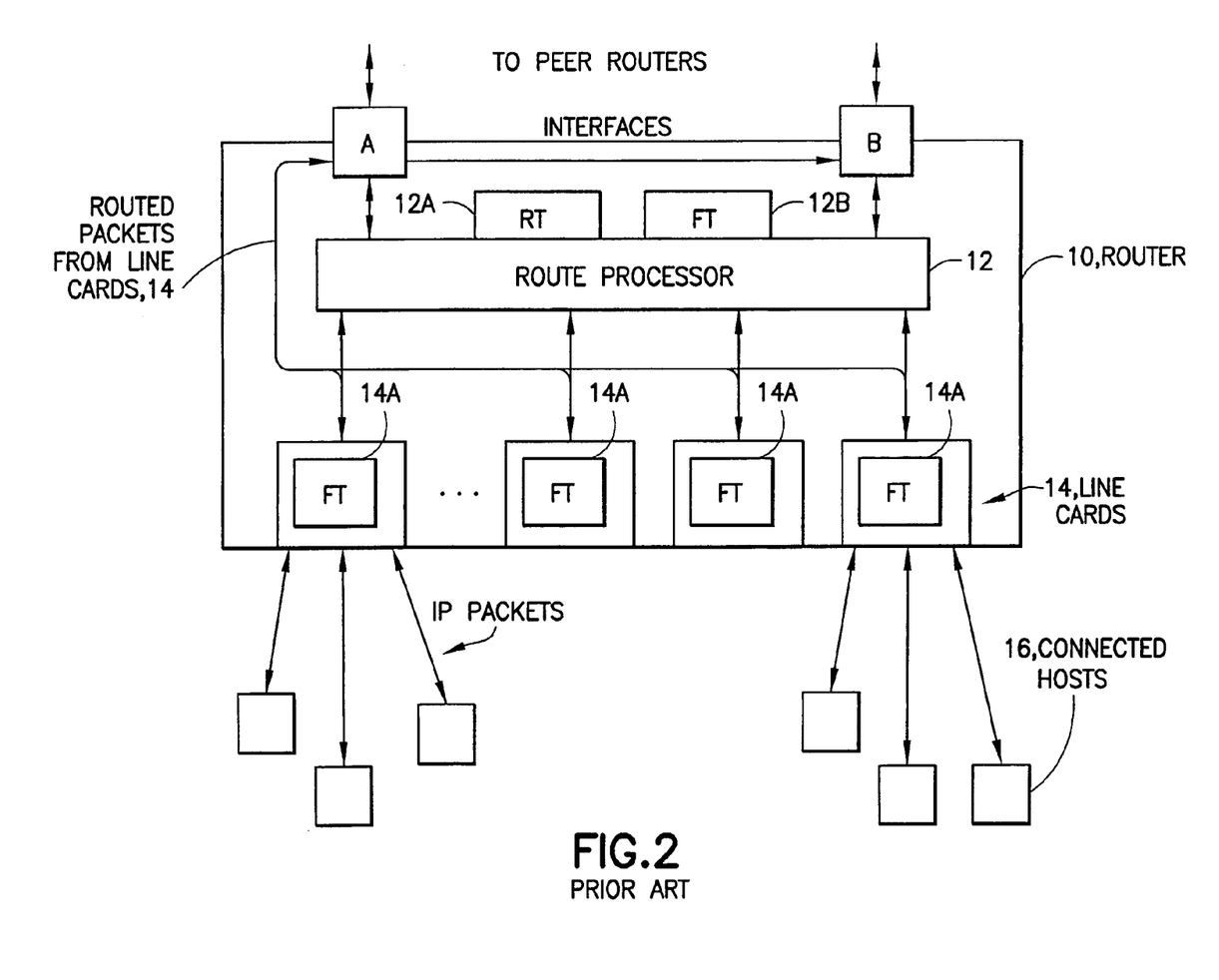

Due to the increase in high speed interconnect hardware, the concept of routing has now become distributed within a single enclosure or unit. Referring to FIG. 2, each line card 14 is provided with intelligence to forward incoming packets based on information in a local forwarding table (FT) 14A. This approach improves performance and also decouples the computation logic executed by the route processor 12 from the forwarding path. The line cards 14 participate in the routing protocol and learn the network prefixes, that is the network addresses (e.g., IP addresses) of the connected hosts 16. The line cards 14 do not process incoming IP control packets, such as Routing Protocol Update packets, but instead forward any incoming IP control packets to the route processor 12 (which may be embodied as a router control card). The route processor 12 is responsible for collecting all of the routing information gathered by each line card 14. The route processor 12 then constructs the routing table 12A and also a global forwarding table 12B. The global forwarding table 12B is basically a subset of the routing table 12A, and is provided from the route processor 12 to each line card 14 where it becomes the local forwarding table 14A. A given line card 14 uses the forwarding table 14A to perform the packet forwarding function. As can be appreciated, in this approach all of the entries of the forwarding table 14A in each line card 14 are the same, irrespective of the line card 14 location and the network topology knowledge that may be acquired by the line card 14 through its interface to the connected hosts 16.

An advantage of this type of approach is that it is straightforward for the route processor 12 to construct the single global forwarding table 12B. Furthermore, it may happen that packets can come through any arbitrary interface of the router 12 (based on changes in topology and possibly load balancing schemes) and, therefore, each line card 14 is able to forward any arriving packet, as all of the line cards 14 have an identical forwarding table 14A. This provides an external appearance that the set of distributed forwarding line cards 14 provide a single-hop type of forwarding.

A problem that arises in this type of system is that a host can send a packet with a spoofed source address through a given one of the line cards 14, which has not previously seen the spoofed network prefix. It thus becomes difficult to detect the forgery of the source address.

Figure 3:
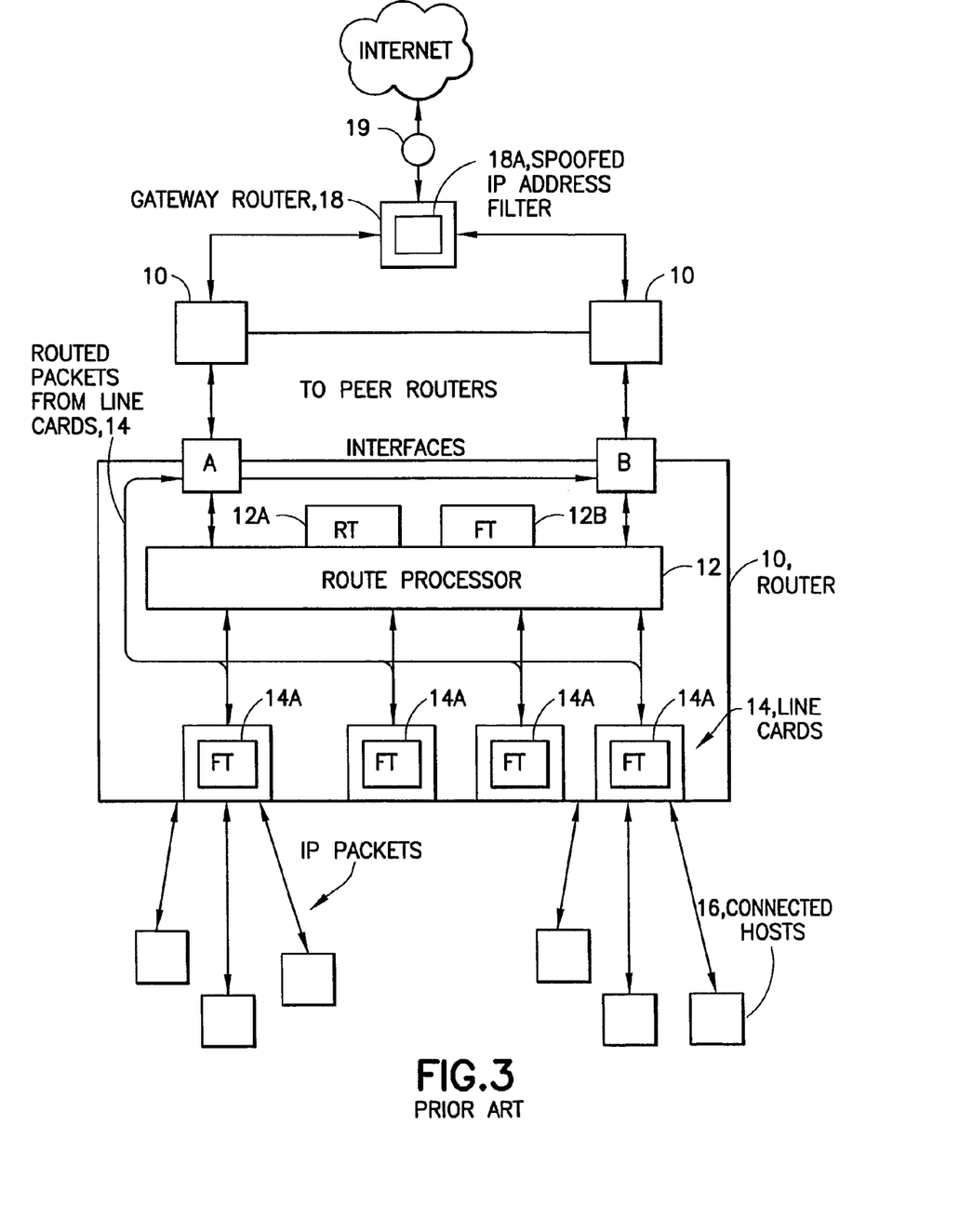

Referring to FIG. 3, in an attempt to avoid this type of spoofing an ISP may configure a filter 18A either at a gateway router 18, or at some intermediate aggregation point, before forwarding packets to an upstream service provider 19. The filter 18A must, however, be kept current to reflect the actual network topology so as to detect a fraudulent source address generated by one of the hosts 16. This requires a constant monitoring and updating of the filter 18A that, unless an attack actually occurs, results in added cost and complexity for the ISP.

As should be appreciated, a need exists to provide an improved technique for detecting spoofed IP source addresses.

SUMMARY OF THE INVENTION

The foregoing and other problems are overcome by methods and apparatus in accordance with embodiments of this invention.

This invention provides a mechanism to enable existing routers to accommodate automatic ingress filtering with minimal increased cost and complexity, and thereby enables routers to detect the occurrence of IP Spoofing in a cost-effective manner. This invention provides a mechanism to both distribute and manage the ingress filter and forwarding tables within the router.

This invention employs an existing routing protocol infrastructure to build the ingress filter table entries, and is applicable for use with a number of networks, including both Ipv4 and Ipv6 networks. The ingress filter technique of this invention is transparent to existing routing protocols. In addition, the ingress filter configuration automatically changes due to network routing topology changes. The ingress filtering mechanism is scalable, and when incorporated as part of the routing protocol can be made transparent to the ISP configuration and management functions of the router and other network nodes.

A method is disclosed herein for routing data packets, as is a data packet router that operates in accordance with the invention. The method includes establishing an ingress filter in individual ones of a plurality of line cards installed within a router and automatically maintaining a content of an ingress filter table of each ingress filter in each line card at least partially in accordance with data packets passing through individual ones of the line cards, where the content comprises an identification of source addresses of hosts coupled to the router. The method further compares a source address of an incoming packet to a line card to the content of the ingress filter table of that line card, and is thus enabled to detect the presence of an IP packet containing a spoofed IP host address. For a first occurrence of a packet having an IP source address that is not found in the ingress filter table, the packet is forwarded to a route processor for analysis. The method further includes changing the content of the ingress filter table based on a result of the analysis to add the source address to the content of the ingress filter table, if the route processor has knowledge that the IP source address is associated with a valid host.

At least some of the packets are Internet Protocol control packets, such as Routing Protocol Update packets, Dynamic Host Configuration Protocol packets, BootTP packets and Address Resolution Protocol packets.

In a preferred embodiment at least some of the hosts are mobile hosts capable of connection and disconnection at different points in a subnetwork (subnet).

BRIEF DESCRIPTION OF THE DRAWINGS

The above set forth and other features of these teachings are made more apparent in the ensuing Detailed Description of the Preferred Embodiments when read in conjunction with the attached Drawings, wherein.

DETAILED DESCRIPTION OF THE PREFERRED EMBODIMENTS

Figure 4:
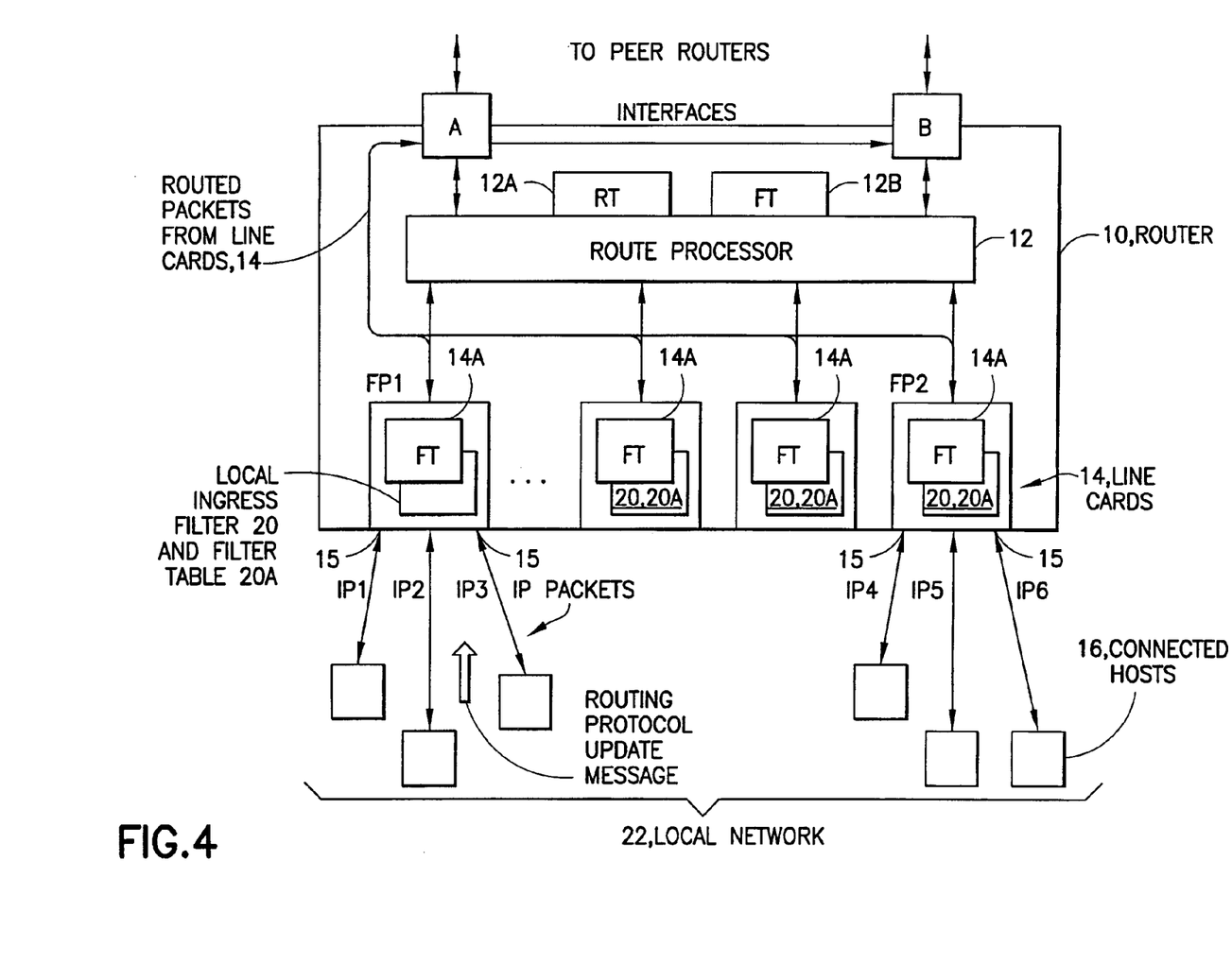
FIG. 4 is a block diagram of a router and associated components constructed and operated in accordance with this invention.
Figure 5:
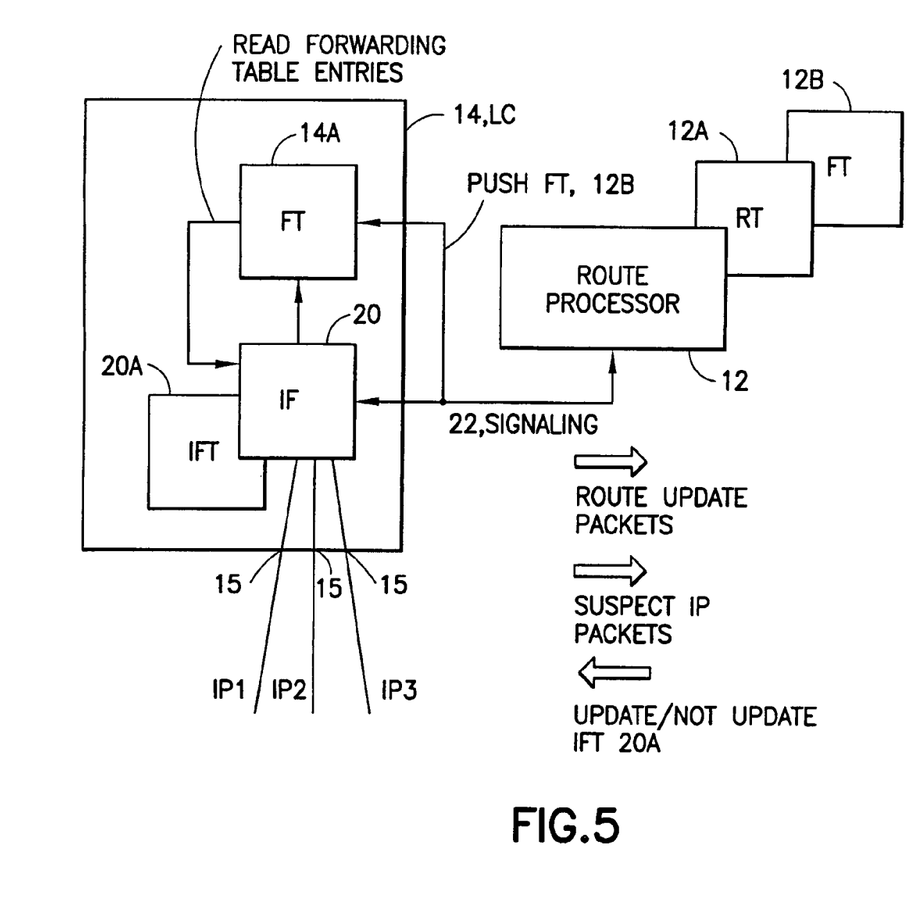
FIG. 5 shows in greater detail the connectivity of the line card and route processor of FIG. 4.

Referring to FIG. 4 and to FIG. 5, this invention maintains the notion of per-hop behavior while forwarding packets, while at the same time the route processor 12 computes and creates the forwarding table 12A and routing protocol updates. Each line card 14 functions as an independent routing element of the router 10, and contains a local ingress filter (IF) 20.

In accordance with this invention, as a line card 14 learns of the network prefixes, the source addresses of connected hosts 16, though its interfaces 15, it constructs a local line card ingress filter table (IFT) 20A. The contents of the ingress filter table 20A changes as the routing topology changes, for example when new hosts 16 are added to the local network 22. The normal operation of the routing protocol is undisturbed, as route protocol update packets that are received by the line card 14 are forwarded to the route processor 12, and the forwarding table 14A is constructed by the route processor 12 and is then pushed to all the line cards 14 in a conventional manner.

It is assumed that the line card 14 includes some local intelligence, such as a data processor embodied as a microprocessor, that executes software for implementing the operations of the ingress filter 20, and that each line card further includes memory for storing the ingress filter table 20A that is operated on by the processor, as described in detail below. The memory can also store the content of the forwarding filter 14A. The local intelligence will also execute the packet forwarding procedures, and any other procedures required for proper operation of the line card 14.

Note in FIG. 1 the placement of the forwarding filter 14A and the ingress filter 20, i.e., the forwarding filter 14A is downstream from the ingress filter 20. This arrangement differs from conventional practice, wherein the host address filter(s) are constructed within the network processor 12 or ASIC or other high-speed hardware for maximum performance.

In this invention the filter table 20A operations such as add/modify/delete are performed by an IP stack in the line card, or they may be instructed by the route processor 12, depending on the choice of the particular routing protocol.

In FIG. 4 the line card FP1 has the physical ports 15 and, by way of example and not limitation, IP1 to IP3 are the respective IP address assigned to line card FP1. The line card FP2 has, by way of example and not limitation, IP4 to IP6 assigned as respective IP addresses. For illustration it shown that an IP control packet, e.g., a routing protocol update message packet, is being received by line card FP1 through port number 2 (that corresponds to the IP2 address). As can be better seen in FIG. 5, the ingress filter 20 is placed first before the forwarding filter 14A in the normal packet reception path. Typically the routing protocols are considered as control packets and are absorbed in the line card stack, and the line card 14 in turn forwards the control packet(s) to the route processor 12 (or control card). The line card 14 may modify the ingress filter table 20A depending on the entries of the local forwarding table 14A.

In operation, if a packet arrives having a source address that is not found in the ingress filter table 20A, and if this is the first occurrence of this possibly spoofed packet, the ingress filter 20 forwards the incoming packet to the route processor 12. In this case the suspect source address field may be legitimate, as it may have arrived at this line card due to a network topology change, or due to a load balancing procedure. For example, another line card or router may have gone down, resulting in a redistribution of the incoming packet traffic. The route processor 12 is assumed to have global knowledge of such conditions, states and occurrences, and thus is given the opportunity to examine the possibly malicious packet. If the packet is legitimate, signalling 22 occurs from the route processor 12 to the line card's ingress filter 20 instructing the ingress filter table 20A to be updated to include the previously unknown source address. In this case the newly arrived packet, and a subsequent arrival of another packet with the same source address, will result in normal processing, as the packet is passed to the forwarding filter 14A and routed on towards the packet's destination address. However, if the route processor 12 does not use the signalling 22 to instruct the ingress filter table 20A to be updated to include the previously unknown source address, or if the route processor 12 affirmatively signals that the ingress filter table 20A not be updated to include the previously unknown source address, then the newly arrived packet, and a subsequent arrival of another packet with the same source address, results in the packet being rejected and not passed to the forwarding filter 14A.

It may happen that a routing protocol update received from neighboring peers (typically other routers 10) may have more than one entry, and in this situation that filter table 20A may have more entries than it is expected.

It may also happen that if the routing topology changes the packets may be redirected. In this situation the ingress filter table 14A may not have the entry, it should not discard the packets, as was discussed above.

To solve these problems, if a routing element becomes unavailable for any reason, or if a topology change occurs, or if load balancing is in effect, the ingress filter 20 can obtain the required information by examining the routing protocol update message(s) as well as the entries of the forwarding table 14A. For example, an as was described above, if a packet comes through the line card interface 15, and there is no entry in the filter table 20A, and if the line card 14 has not learned of the subnet through any of its neighboring peers, the line card filter 20A informs the route processor 12 that it has received a packet with unknown source address. Since the route processor 12 has complete knowledge of the routing topology it can decide whether to add an entry in the line card's filter table 20A to allow these packets, or to discard the packets.

Figure 6:
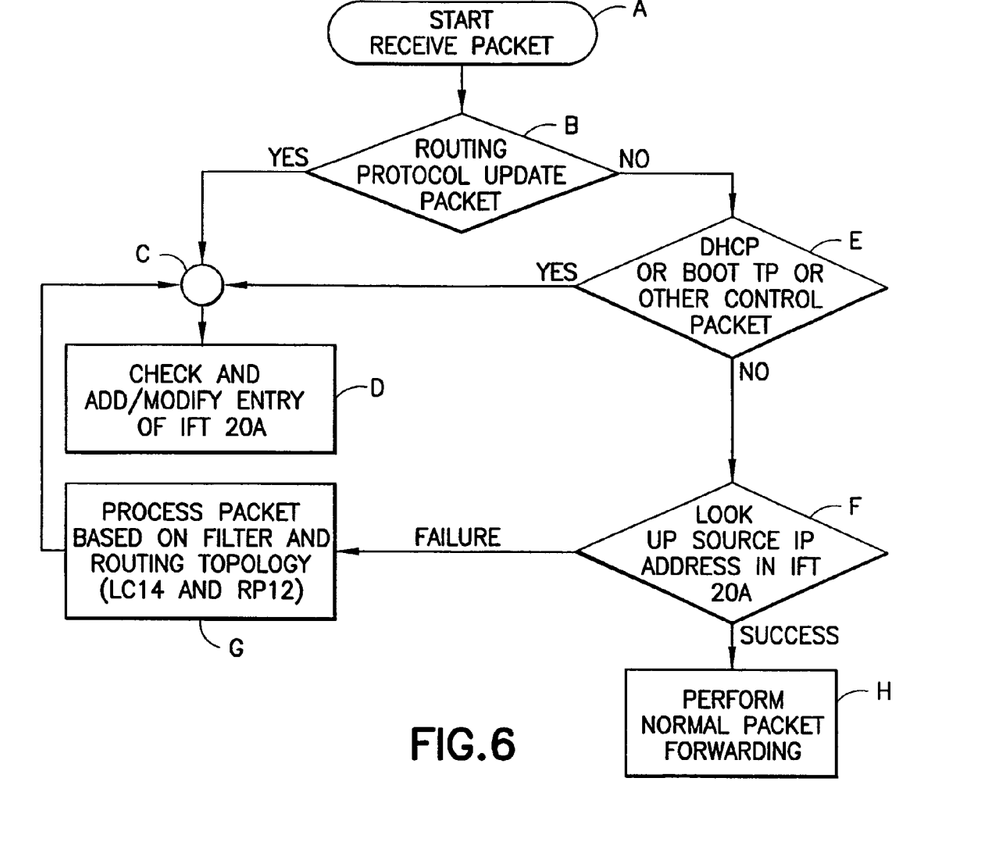
FIG. 6 is flow chart that illustrates the process of packet flow.

The flow chart of FIG. 6 shows the process of packet flow, and how the line card 14 interprets the packet flow, in greater detail. At block A the method starts with the arrival of a packet at the interface 15 of a line card 14. At block B a test is made to determine if the packet is an IP control packet, specifically a routing protocol update (RPU) packet. The RPU packet propagates a sequence of names or name space regions and associated distance metrics. Additional data can be included. If the packet is a RPU packet control passes to the connector C and then to block D where an IFT 20A entry is checked, created or modified, depending on the content of the RPU packet. In this manner the ingress filter 20 can be automatically updated to account for changes in the topology of the local network 22. The RPU packet will also be passed to the route processor 12. If the packet is not a RPU packet control instead passes to block E where a test is made to determine if the packet is a dynamic host configuration protocol (DHCP) packet, a BootTP packet, or some other type of control packet. The DHCP packet is one related to an Internet protocol for automating the configuration of computers and other devices that use TCP/IP. DHCP can be used to automatically assign IP addresses, to deliver TCP/IP stack configuration parameters, such as the subnet mask and default router, as well as to provide other configuration information. In the context of the presently preferred embodiment the DHCP packet can be sent to indicate the connection of a mobile host, such as an Internet-enabled mobile host or mobile terminal. Mobile hosts of interest include those that are capable of connection and disconnection at different points in the subnet. The BootTP packet is sent at initial boot up (e.g., at power on) and is used to give layer 2 information, and is useful in the assignment of an IP (source) address to a requesting host, such as an Internet-enabled mobile host or mobile terminal. If the packet is one of these types of control packet control passes to the connector C and then to block D, as discussed above, and the packet is also passed to the route processor 12. Note that this flow may not happen all at once. For example, if a BootTP packet is detected the IF 20 and IFT 20A will record the occurrence of the request for an IP source address, and will then intercept and record the assigned IP source address when same is assigned to the requesting host 16. In this manner the new IP source address on the subnet is stored as an entry in the IFT 20A, enabling a subsequent packet bearing this source address to be treated as a valid and allowed packet.

If the packet is not a DHCP packet, a BootTP packet, or some other type of control packet control passes from block E to block F to lookup the packet's source address in the IFT 20A. If the lookup fails, and assuming that this is the first occurrence of the packet having this particular unknown IP source address, control passes to block G where the line card 14 and the route processor 12 cooperate as described above to process the packet based on the current filter and routing topology. For example, while the packet's IP source address is not one previously encountered by the IF 20, and is hence not stored in the IFT 20A, the route processor may have knowledge that the packet is from a valid host 16 that was received at the line card 14 due to a load balancing function being in effect. In any event, control eventually passes to the connector C and then to block D to modify the contents of the IFT 20A by adding the IP source address, or to not add the IP source address (thereby indicating that the packet contains a spoofed IP source address and is thus not valid). If the lookup is successful at block F then control passes to block H to forward the packet downstream to the forwarding table 14A for enabling the packet to be correctly forwarded towards its destination IP address.

On the first or subsequent appearance of the packet having the unknown IP source address, block G operates to simply reject or discard the packet if the packet is one that is assumed to contain a spoofed IP source address. This prevents the packet from reaching the forwarding table 14A, and thereby prevents the packet from being forwarded beyond the line card 14 to the destination IP address. This is the desired result.

Figure 7:
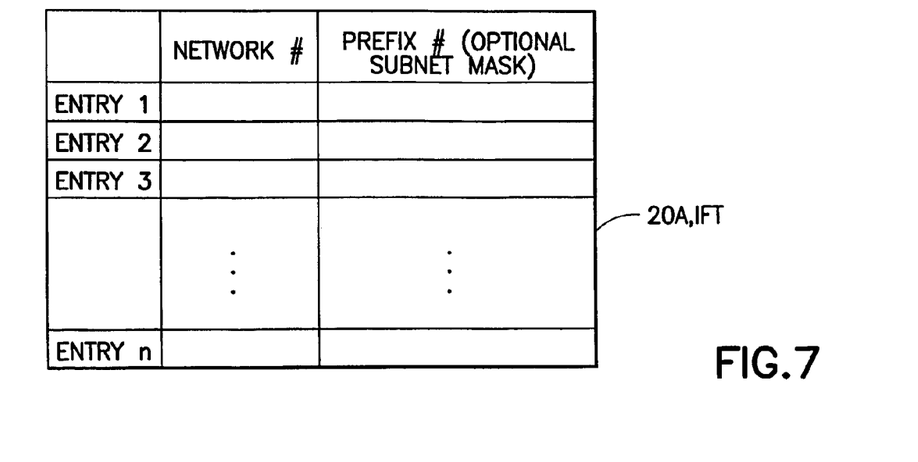
FIG. 7 shows an example of a line card Ingress Filter Table.

FIG. 7 shows an example of the IFT 20A. The IFT 20A is constructed preferably as a flat table, and contains at least in each entry 1-n a Network Number field and an associated Network Prefix field, which may include a subnet mask As an example, for Class B IP source addresses there can be a 16-bit network number field and a 16-bit Host ID address field, enabling up to 64 k of the hosts 16 to be specified. The host IP addresses can be consolidated to form the subnet mask, as is well known in the art.

The IFT 20A is automatically constructed and maintained by the line card 14 as described above, and advantageously enables spoofed IP source addresses to be detected and the malicious packets to be removed at the level of the line cards 14. If all routers 10 implement this functionality then there is no need to configure additional ingress filters, such as one at the gateway router 18, although the use of this invention does not preclude the presence of an ingress filter or ingress filters at higher levels.

It is noted that it is difficult to prevent a Byzantine (random) failure where a legitimate host 18 in the network 22 misbehaves and steals the identity of another network element (host). For example, assume four hosts 16 and that A, B, C, M are the IP addresses of the hosts, where M is the malicious host (node). After successful authentication host M can generate a packet with the source IP address of host A and address the packet to any destination. This can be detected with the help of Address Resolution Protocol (ARP) cache entries if the node happens to be on the same subnet. This is clearly a reason why ingress filtering should not be performed only near the gateway 18, and serves to emphasize the utility of the distributed ingress filtering at the level of the line cards 14. If one incorporates the ingress filtering function into all routing elements, whenever the host M sends a packet with a host address belong to host A to its default router, the ARP cache detects the duplication and the collision of the IP address entry for the host A, or in the management station of the router 10.

It should be noted that an exception occurs if the nodes are incorporating layer 2 or layer 3 load balancing schemes, as the packet should not be rejected but should instead be forwarded, as this is purely a configuration process.

Another situation of interest is if the host M is generating a request by placing an unused IP address belonging to the subnet into a packet. This case can only be detected by the routing element (the IF 20/IFT 20A) by carefully scanning the DHCP message passed through the router 10 to capture and accordingly modify the ingress filter table 20A as discussed above. Note that is process requires session persistence, as multiple packets are required, and thus may require secondary local storage in the line card 14. However, this process prevents one from installing a host at some arbitrary point to generate a malicious request.

The above described method and apparatus does not require any additional router/system configuration, and the router 10 learns, more specifically the IF 20/IFT 20A learns of the identities of the connected valid hosts 16 though the routing RPU messages, or through the DHCP, or BootTP, or ARP message exchanges. These teachings are thus not limited to the use of ARP packets, as other discovery-type packets can be used as well.

If the router 10 is being configured statically then the IFT 20A is preferably constructed from the static filter entries, or if the host addresses are assigned statically then the contents of the IFT 20A is created manually. However, in most cases IP addresses are assigned through the DHCP messages, and thus the creation and maintenance of the IFT 20A can be made fully automatic.

Those skilled in the art should appreciate that this invention finds particular utility in mobility management of mobile hosts, such as, but certainly not limited to, those in the evolving third generation partnership project (3G-PP) Internet enabled mobile terminals and infrastructure.

While these teachings have been particularly shown and described with respect to preferred and exemplary embodiments thereof, it will be understood by those skilled in the art that changes in form and details may be made therein without departing from the scope and spirit of these teachings.

What is claimed is:

1. A method for routing data packets, comprising:
   establishing an ingress filter in individual ones of a plurality of line cards installed within a router;
   automatically maintaining a content of an ingress filter table of each ingress filter in each line card at least partially in accordance with data packets passing through individual ones of the line cards, where the content comprises an identification of source addresses of hosts coupled to the router;
   comparing a source address of an incoming packet to a line card to the content of the ingress filter table of that line card, and if the source address is not found, forwarding the incoming packet to a route processor for analysis; and,
   adding the source address to the content of the ingress filter table in response to analyzing that the source address of the incoming packet is associated with a valid host.

2. The method as in claim 1, where at least some of the data packets comprise Internet Protocol control packets.

3. The method as in claim 1, where at least some of the data packets comprise Internet Protocol Routing Protocol Update packets.

4. The method as in claim 1, where at least some of the data packets comprise Internet Protocol Dynamic Host Configuration Protocol packets.

5. The method as in claim 1, where at least some of the data packets comprise BootTP packets.

6. The method as in claim 1, where at least some of the data packets comprise Address Resolution Protocol packets.

7. A method as in claim 1, where at least some of hosts comprise mobile hosts capable of connection and disconnection at different points in a subnet.

8. A data packet router, comprising:
a route processor; and
a plurality of line cards bidirectionally coupled to said route processor, each of said line cards comprising an ingress filter and a processor for automatically maintaining a content of an ingress filter table at least partially in accordance with data packets passing through individual ones of said line cards, where the content comprises an identification of source addresses of hosts coupled to the router, where said processor is configured to compares a source address of an incoming packet to the line card to the content of the ingress filter table, and if the source address is not found, configured to forward the incoming packet to said route processor for analysis, said route processor further configured to analyze the incoming packet and in response to a result of the analysis that the source address of the incoming packet is associated with a valid host, said route processor is configured to add the source address to the content of the ingress filter table.

9. The data packet router as in claim 8, where at least some of the data packets comprise Internet Protocol control packets.

10. The data packet router as in claim 8, where at least some of the data packets comprise Internet Protocol Routing Protocol Update packets.

11. The data packet router as in claim 8, where at least some of the data packets comprise Internet Protocol Dynamic Host Configuration Protocol packets.

12. The data packet router as in claim 8, where at least some of the data packets comprise BootTP packets.

13. The data packet router as in claim 8, where at least some of the data packets comprise discovery packets.

14. The data packet router as in claim 8, where at least some of the data packets comprise Address Resolution Protocol packets.

15. The data packet router as in claim 8, where at least some of hosts comprise mobile hosts capable of connection and disconnection at different points in a subnet.

16. A data communications network comprising a plurality of hosts, where at least some of the hosts comprise mobile hosts capable of connection and disconnection at different points; and at least one data packet router that comprises a route processor and at least one line card that is bidirectionally coupled to said route processor, said at least one line card comprising an ingress filter and a processor for automatically maintaining a content of an ingress filter table at least partially in accordance with data packets passing through said at least one line card, where the content comprises an identification of source addresses of hosts coupled to the router, where said processor is further configured to compares a source address of an incoming packet to said at least one line card to the content of the ingress filter table, and if the source address is not found, configured to forwards the incoming packet to the route processor for analysis and, in response to the analysis that the source address of the incoming packet is associated with a valid host, configured to modify the content of the ingress filter table to add the source address to the content of the ingress filter table.

17. The data communications network as in claim 16, where at least some of the data packets comprise at least one of Internet Protocol control packets, Internet Protocol Routing Protocol Update packets, Internet Protocol Dynamic Host Configuration Protocol packets, BootTP packets, discovery packets and Address Resolution Protocol packets.

18. The data communications network as in claim 16, where at least some of said mobile hosts comprise a wireless communications device.

19. A computer program product embodied on a computer-readable storage medium for directing a data processor to process data packets, comprising operations of:
in a line card installed within a router, operating an ingress filter having an associated ingress filter table comprising automatically maintaining a content of said ingress filter table at least partially in accordance with data packets received at said line card, where the content comprises an identification of source addresses of hosts coupled to the router;
comparing a source address of a received data packet at said line card to the content of said associated ingress filter table, and if the source address is not found, forwarding the received data packet to a route processor for analysis and
in response to analyzing that the source address of the received data packet is associated with a valid host, adding the source address to the content of the ingress filter table.

20. A line card operable within a data packet router, comprising:
ingress filter means having an associated ingress filter table means, said ingress filter means comprising means for managing a content of said associated ingress filter table means at least partially in accordance with data packets received at said line card, where the content comprises an identification of source addresses of hosts coupled to the router;
means for comparing a source address of a received data packet at said line card to the content of said associated ingress filter table means, and if the source address is not found, forwarding the received data packet to a route processor for analysis; and
means for changing the content of said associated ingress filter table means to add the source address to the content of said associated ingress filter table means in response to analyzing that the source address of the received data packet is associated with a valid host.

* * * * *

UNITED STATES PATENT AND TRADEMARK OFFICE
CERTIFICATE OF CORRECTION

PATENT NO. : 7,167,922 B2
APPLICATION NO. : 10/273946
DATED : January 23, 2007
INVENTOR(S) : Narayanan It is certified that error appears in the above-identified patent and that said Letters Patent is hereby corrected as shown below:

Claim 8, Column 9, line 16 delete "compares" and replace with --compare--6.

Claim 12, Column 9, line 37, after delete "m" and replace with --in--.

Claim 13, Column 9, line 39 delete "m" and replace with --in--.

Claim 16, Column 10, line 1, delete "compares" and replace with --compare--.

Claim 16, Column 10, line 4, delete "forwards" and replace with --forward--.

Signed and Sealed this

First Day of May, 2007

JON W. DUDAS
*Director of the United States Patent and Trademark Office*